235-380
10/5/82
SR
XR 4,353,064

United States Patent [19] | [11] 4,353,064
Stamm | [45] Oct. 5, 1982

[54] BATTERY OPERATED ACCESS CONTROL CARD

[75] Inventor: Thomas A. Stamm, Chicago, Ill.

[73] Assignee: Honeywell Inc., Minneapolis, Minn.

[21] Appl. No.: 225,087

[22] Filed: Jan. 14, 1981

[51] Int. Cl.³ .............................................. H04Q 9/00

[52] U.S. Cl. ............................... 340/825.31; 235/380; 235/382; 340/825.32; 340/825.33; 340/825.69

[58] Field of Search ...................... 340/825.69, 825.31, 340/825.32, 825.33; 235/380, 382

[56] References Cited

U.S. PATENT DOCUMENTS 3,637,994 1/1972 Ellingboe ........................ 340/258 B
3,839,709 10/1974 Sugiura ........................ 235/61.12 N
3,848,229 11/1974 Perron et al. .................... 340/149 A
3,891,980 6/1975 Lewis et al. .................... 340/258 D
3,934,122 1/1976 Riccitelli ........................ 235/61.7 B
3,944,976 3/1976 France ............................ 340/146.2
4,079,356 3/1978 Anagnost et al. .............. 340/149 A

*Primary Examiner*—Harold I. Pitts
*Attorney, Agent, or Firm*—Trevor B. Joike

[57] ABSTRACT

An access control card for use in an access control system. A battery, a wireless signal sensor such as an antenna for receiving coded wireless signals such as coded radio frequency signals generated by a card reader, a clock connected to the battery and including a receiver are connected to the antenna for supplying a received signal based upon the coded radio frequency signal. A memory for stores first and second stored codes, and a transmit circuit connected to the antenna, to the clock and to the memory compares the first stored code to the received signal and transmits the second stored code when there is a match between the received signal and the first stored code.

38 Claims, 8 Drawing Figures

BATTERY OPERATED ACCESS CONTROL CARD

BACKGROUND OF THE INVENTION

The present invention relates to an access control card useful in access control systems to permit access to secured areas, secured information, secured systems or the like, and, more particularly, to a battery operated access control card which compares a code generated by a card reader to a first stored code and, if there is a match, for transmitting a second stored code back to the card reader to be used by the card reader to determine whether the holder of the card should be permitted to take the desired action.

Access control systems have been utilized in the past to restrict access to protected areas, information, or the like to only those to whom access is authorized. Such systems usually involve a card reader into which a coded card is inserted and read. The code on the card, which may periodically be changed, may be identical for all those wishing to have access. Alternatively, each person who is authorized to have access may be assigned his own personal code which again may be periodically changed. Upon the recognition of a permissible code, the card reader and associated system will permit access.

These card readers usually comprise a cabinet for housing the access control system or subsystem thereof and typically have a plurality of sensing fingers for making contact with the cards inserted into the reader and for sensing the code on the card to allow access if the card carrier has the proper code. To gain access, the card is inserted into a slot in the cabinet which results in the wiping over of the surface of the card by the sensing fingers during both this insertion and the subsequent withdrawal of the card.

Because these typical prior art card readers involve contact between the reader and the card, there is substantial wear and tear on both the reader and the card which adversely affects the reliability of the overall system. Moreover, since there is direct contact between the reader and the card, and since card readers used in access control systems are quite often located outdoors, certain elements of the card reader, notably the sensing fingers, are exposed to the vagaries of weather and are, therefore, subject to corrosion which again adversely affects the reliability of the system.

The prior art has attempted to solve many of these problems by providing passive cards which either load down a magnetic field which can be then sensed by the generator of the magnetic field to permit access or to receive an RF transmission, code it and return it to the generator of the RF signal to be decoded. An example of this latter approach can be found in U.S. Pat. No. 4,210,900 which shows a surface acoustic wave device for receiving an RF generated signal and for transmitting a coded RF signal in response thereto to a card reader. However, the body capacitance of the users of many types of these passive devices tends to ground the signals being transmitted by the reader so that no useful signal is returned to the reader and access will not be permitted. U.S. Pat. No. 4,210,900 shows one way around this problem by providing a card which can be inserted into a reader but which does not require physical contact with any part of the reader and in which the sensing elements of the reader can be sealed from exposure.

SUMMARY OF THE INVENTION

The card according to the present invention offers an improved alternative solution by providing a card having a battery, an antenna arrangement for receiving coded wireless signals generated by a card reader, a clock circuit connected to the battery and including a receiver connected to the antenna for supplying a received signal based upon the coded wireless signal, a memory for storing first and second stored codes, and a transmit circuit connected to the antenna arrangement, to the clock circuit and to the memory for comparing the first stored code and the received signal and for transmitting the second stored code when there is a match between the received signal and the first stored code.

Since the card has a power supply in the form of a battery located thereon, the signal strength may be maintained such that a useful signal can be transmitted from the card to the reader. Thus, the card need not be inserted into a card reader. There is no actual physical contact between the card and the reader and the card may instead be kept in the pocket or worn as a badge.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
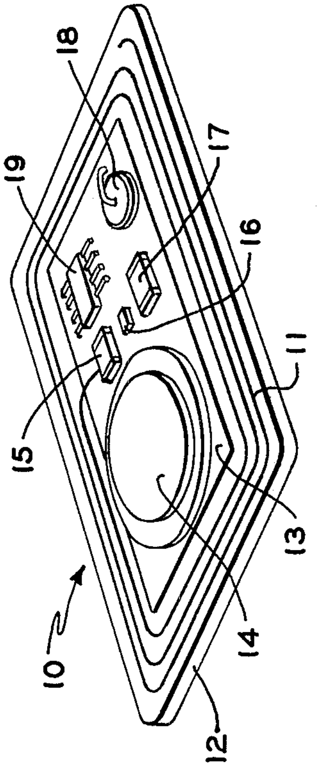
FIG. 1 shows a card according to the present invention with the battery and circuit elements located thereon.

Access control card 10 shown in FIG. 1 may have a subbase 12 made of a suitable plastic or similar material for holding the battery and circuit elements of the card. Although the card can receive any type of wireless transmission from a transmitter such as ultrasonic, infrared, etc., the preferred embodiment according to the present invention uses RF transmissions. Accordingly, antenna 11 (which may be any other type of wireless signal sensing means depending upon the form of energy used in the transmission) is wound in loop form around the periphery of card 12 and is connected to a printed circuit type board 13 located in the center of card 12. The printed circuit board 13 supports battery 14 which forms the power source for access control card 10 and may be a lithium battery for small size and long life. In addition, circuit elements 15–18 are located on printed circuit board 13 and may comprise the capacitors and resistors of the card mounted system. Chip 19 may comprise the logic gates, latches, flip-flops and counters which form the rest of the system mounted on access control card 10.

Figure 2:
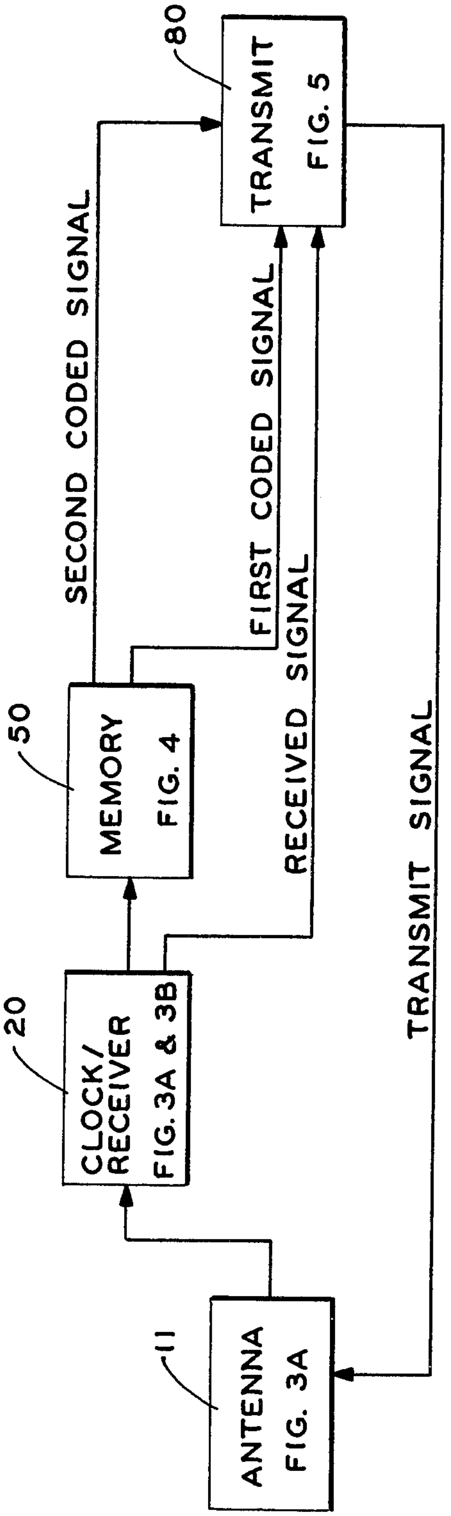
FIG. 2 shows a block diagram for the circuit on the card shown in FIG. 1.

The block diagram of the system mounted on access control card 10 is shown in FIG. 2. Each block contains the name of the function for the block and the corresponding figure number of the figure showing the details of the block. Broadly, the system mounted on access control card 10 comprises an antenna 11 which is used for receiving the radio frequency generated signal from a card reader and to transmit the access control card code (second stored code) back to the reader for verification. Although antenna 11 may comprise an antenna for receiving the signal transmitted by the card reader and a separate antenna for transmitted the card code back to the card reader, in the preferred embodiment it comprises the single loop 11 wound around the periphery of the card.

The signal received by antenna 11 is transmitted to clock/receiver circuit 20. In circuit 20, the receive circuit initializes the operation of a clock which then controls the overall functioning of the system mounted on access control card 10. Specifically, the clock in clock/receiver 20 clocks memory 50 to supply a first coded signal to transmit circuit 80. The receiver portion of clock/receiver 20 supplies the received signal or a received signal based upon the radio frequency signal received by antenna 11 to transmit circuit 80. Transmit circuit 80 compares the first coded signal with the received signal.

If these two signals match, the clock continues to drive memory 50 to then supply the second coded signal to transmit circuit 80 which then supplies this second coded signal as a transmit signal to antenna 11 for transmission back to the card reader. However, if there is a mismatch between the first coded signal and the received signal, then the second coded signal is not supplied by transmit 80 as a transmit signal to the antenna 11.

Figure 3A:
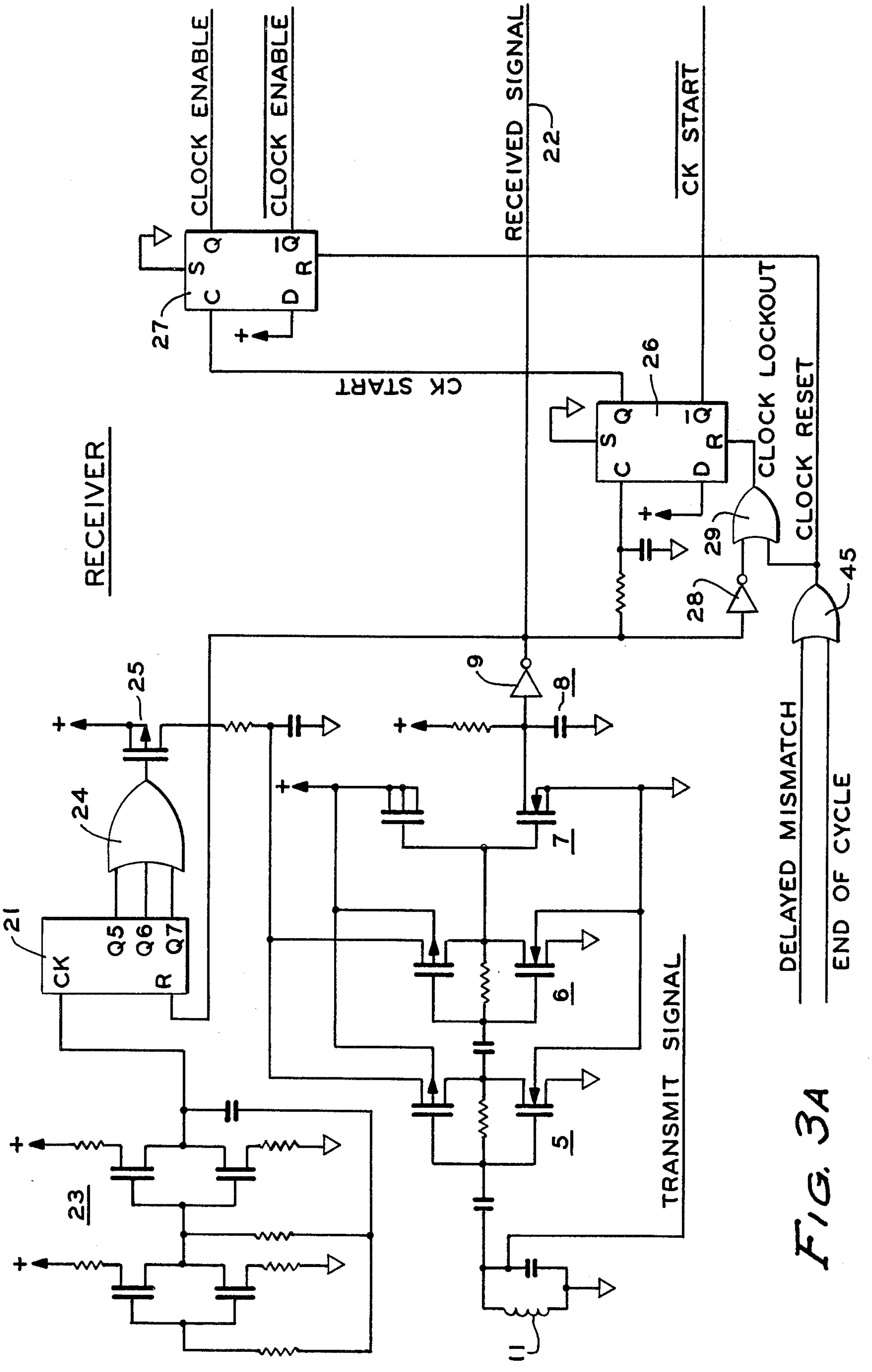
FIGS. 3A and 3B show the antenna and clock/receiver circuit shown in block form in FIG. 2.
Figure 6A:
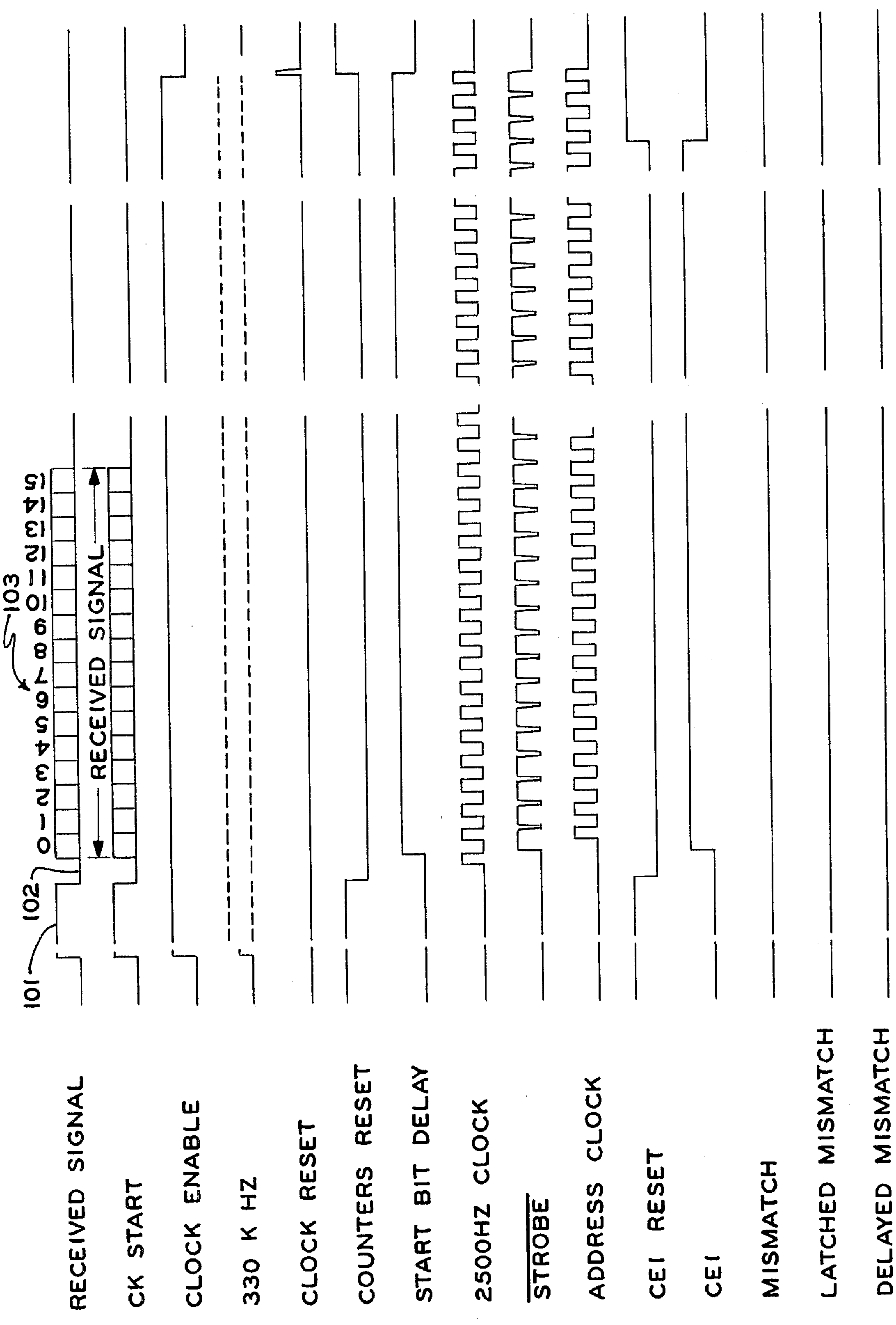
FIGS. 6A and 6B show the timing diagrams for the circuits shown in FIGS. 3A-5.

As shown in FIG. 6A, the coded radio frequency signal, which is connected through as a received signal, comprises a continuous carrier signal 101 terminated by a start bit 102 and a series of 16 data bits 103. The clock shown in FIG. 3B synchronizes to the trailing edge of the carrier, skips the start bit space and then begins addressing memory 50 shown in FIG. 4. Antenna 11 is shown in FIG. 3A which also shows the receiver portion of clock/receiver 20. Antenna 11 receives the RF transmission from the card reader and supplies this signal through amplifiers 5 and 6 to switch 7 which acts as a charge and discharge control for capacitor 8. The charge across the capacitor is then connected through inverter 9 and provides the received signal shown in FIG. 6A.

Since it is desired to save battery energy, a switch is provided between the battery and the amplifier sections 5 and 6 of the receiver. The switch periodically allows the receiver to sample for transmission from the card reader. Any received signal as supplied to output line 22 by inverter 9 is then used as a reset on counter 21 to lock on stages 5 and 6 for reception. This allows the card reader to, for example, permit access only after a predetermined number of transmissions, while minimizing waiting time for card receiver activation. Thus, switch 25 is connected between the battery and amplifier sections 5 and 6. Switch 25 is controlled by a timing circuit comprising an astable multivibrator 23 providing the clock signal to counter 21. Decoder 24 decodes the Q5-Q7 counter outputs and operates as shown to control switch 25.

The output from inverter 9, i.e. the received signal, is connected to the C input of flip-flop 26 for providing the CK START and the $\overline{\text{CK START}}$ signals. The CK signal is shown in FIG. 6A and the $\overline{\text{CK START}}$ signal is merely the inversion of the CK START signal. The leading edge of the carrier signal causes flip-flop 26 to switch which drives its Q output high and its $\overline{Q}$ output low. When the Q output is driven high, flip-flop 27 is likewise switched to drive its Q output high and its $\overline{Q}$ output low. When the Q output of flip-flop 27 is driven high the CLOCK ENABLE output is driven high for allowing oscillator 31 of the clock circuit shown in FIG. 3B to begin providing clock pulses. It is to be noted that the trailing edge of each pulse in the received signal will reset flip-flop 26 through inverter 28 and OR gate 29 and that each leading edge will switch flip-flop 26 so that the CK START output will be a series of pulses matched to the pulses of the received signal and the CK START signal will be the inversion of these pulses. However, flip-flop 27 is only reset by the CLOCK RESET signal and as long as the CLOCK RESET signal does not change, flip-flip 27 will switch once and remain in its switched condition as shown by the CLOCK ENABLE signal of FIG. 6A. Also, when the carrier signal 101 goes low, the $\overline{\text{CK START}}$ signal causes flip-flop 32 (FIG. 3B) to switch driving the COUNTERS RESET signal low, synchronizing timing for all subsequent operations.

Oscillator 31 is a crystal based oscillator providing, for example, a 330 KHz output signal which is used for providing the timing of the access control card. Oscillator 31 drives counter 33 which has its Q1 output connected to the C terminal of flip-flop 34 and its Q2-Q7 terminals coupled through decoder 35 to the D terminal of flip-flop 34. Flip-flop 34 thus provides the $\overline{\text{STROBE}}$ signal as shown in FIG. 6A and the STROBE signal which is an inversion of $\overline{\text{STROBE}}$. In addition, output Q7 of counter 33 provides the 2500 Hz CLOCK signal and the 2500 Hz CLOCK signal through inverter 36. As further shown in FIG. 3B, the 2500 Hz CLOCK signal is connected to the C terminal of flip-flop 41 which is used to enable AND gate 42 to pass the $\overline{\text{2500 Hz CLOCK}}$ signal to the ADDRESS CLOCK output. Flip-flop 41 is used to delay the clock by 1 bit space.

Figure 3B:
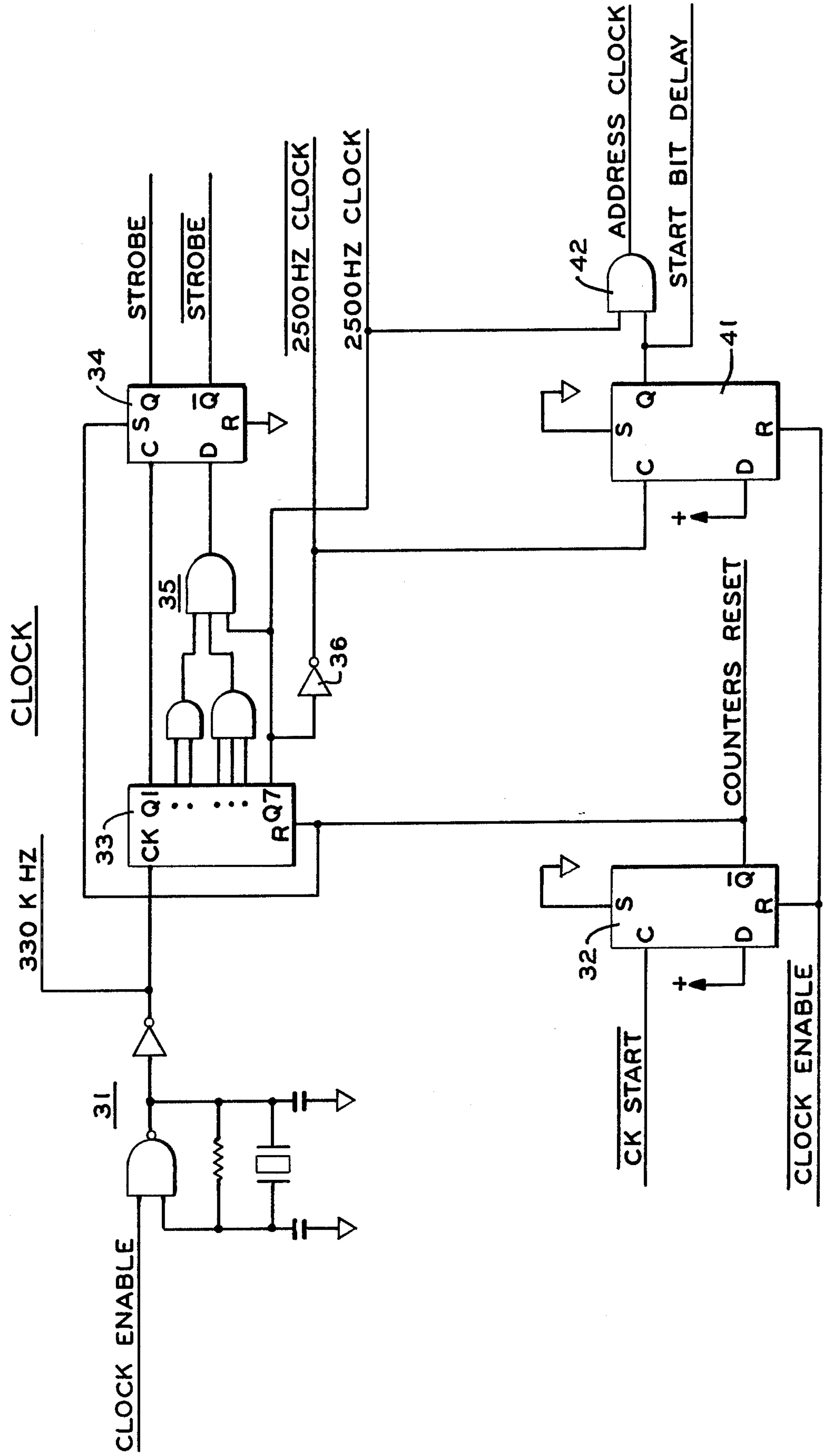
Figure 4:
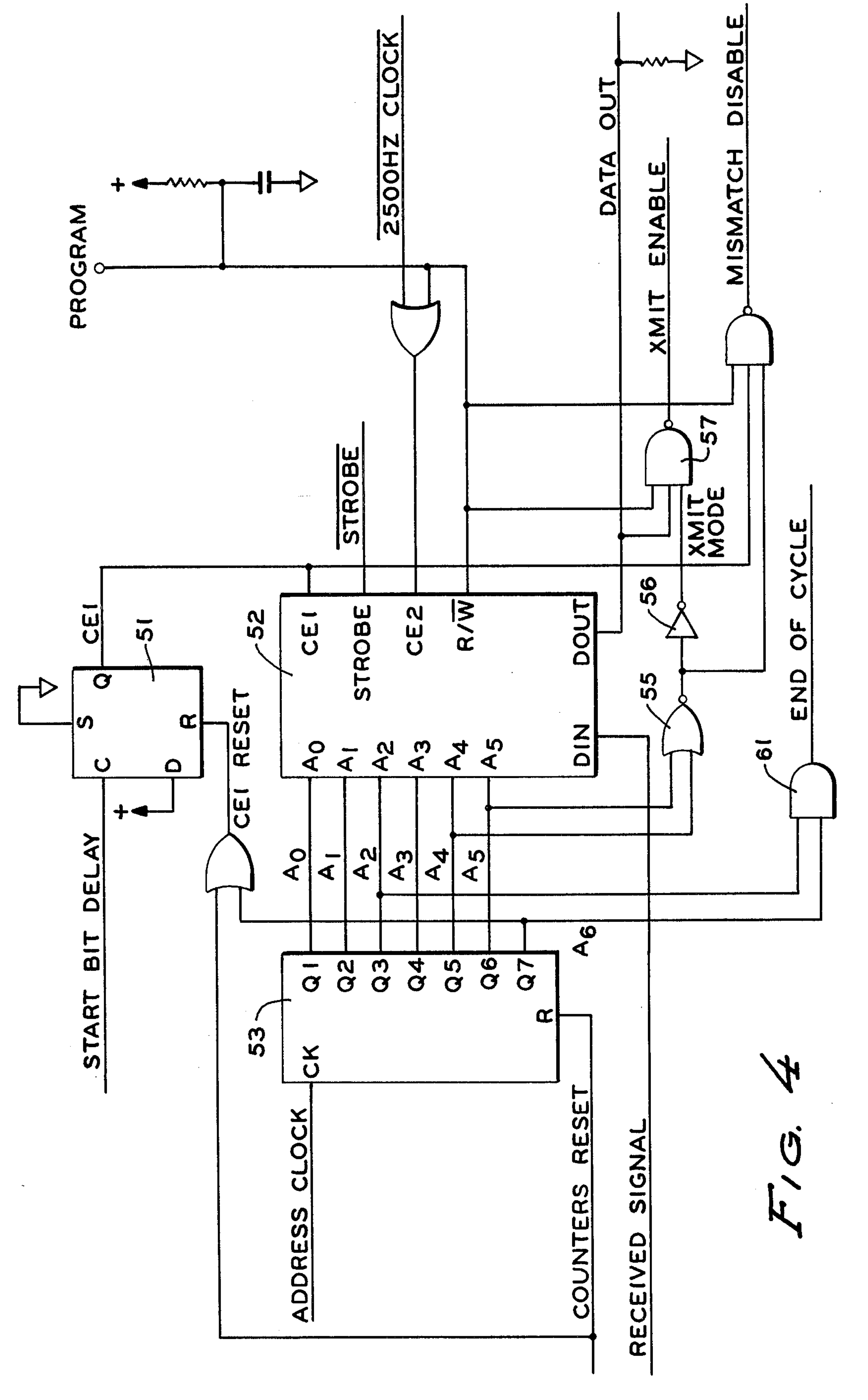
FIG. 4 shows the memory shown in block form in FIG. 2.

The START BIT DELAY provided by the Q output of flip-flop 41 in FIG. 3B is used to trigger flip-flop 51 shown in FIG. 4 to enable memory chip 52. At the same time, the ADDRESS CLOCK signal drives counter 53 for providing the addresses to memory chip 52. Counter 53 addresses first those locations in memory chip 52 in which a first coded signal corresponding to the RECEIVED SIGNAL are stored. Memory chip 52 will, in response to the addresses supplied by counter 53, transmit out this first coded signal over its output terminal $D_{out}$.

Figure 5:
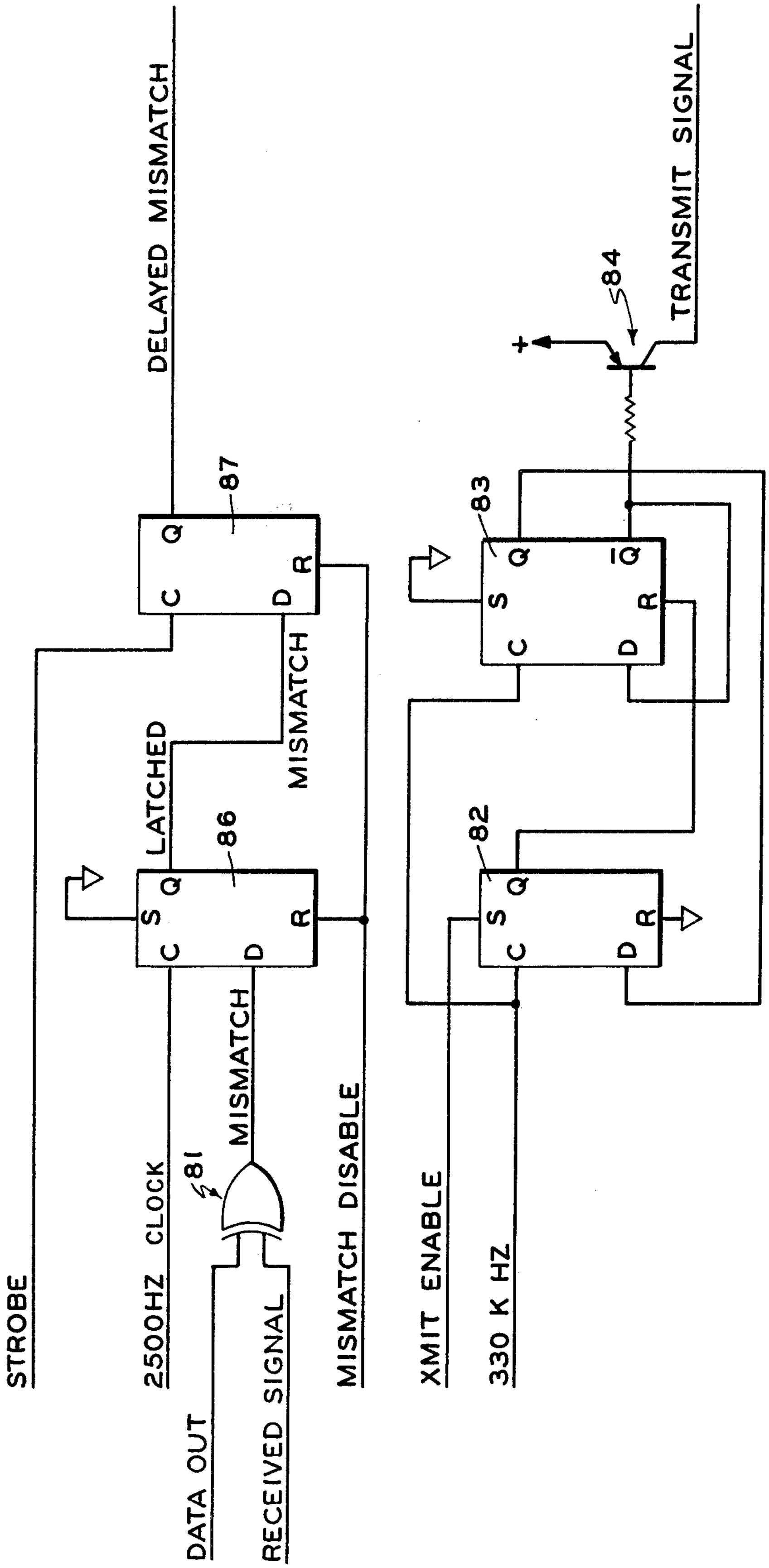
FIG. 5 shows the transmit circuit shown in block form in FIG. 2.
Figure 6B:
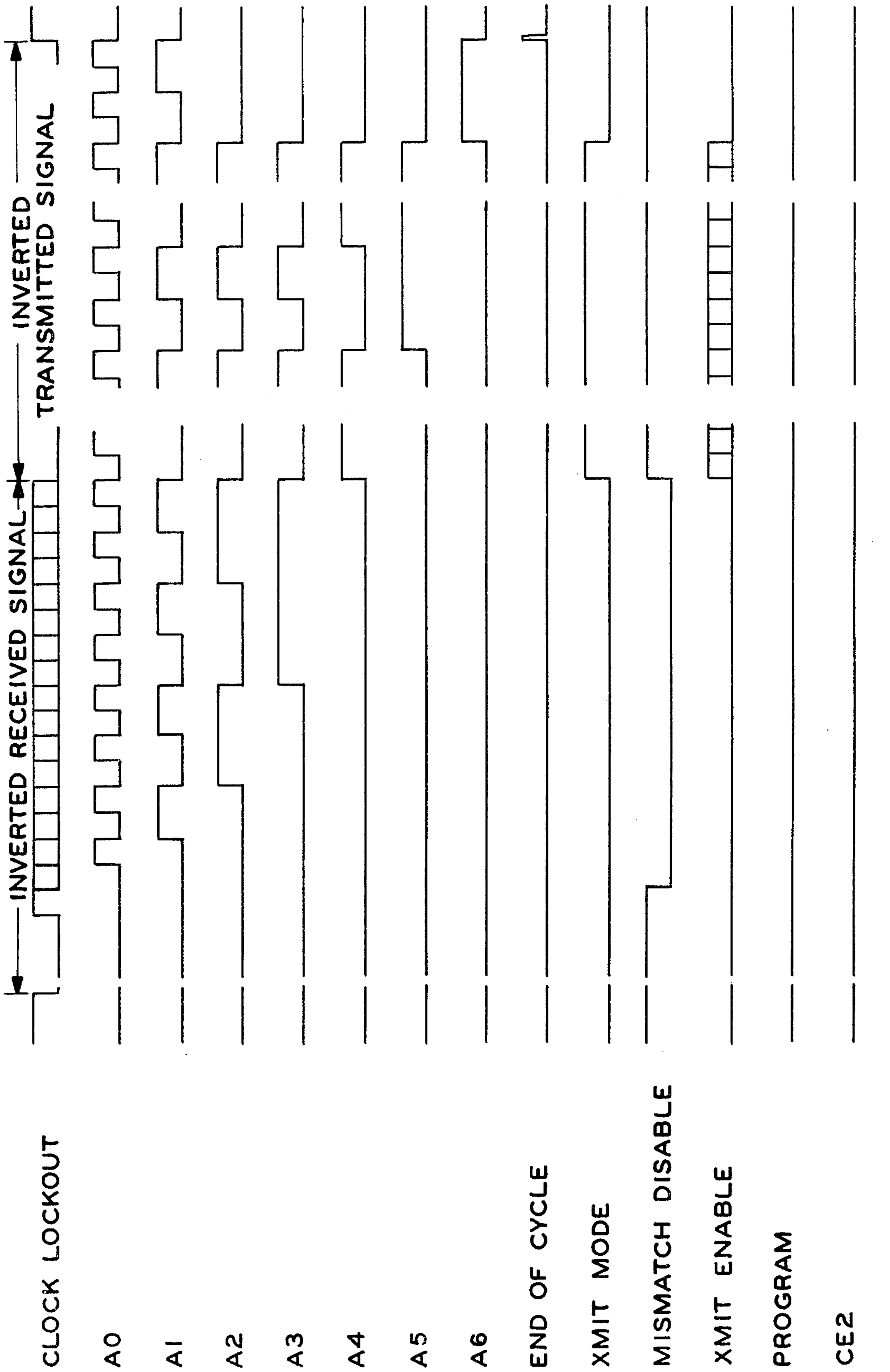

The first coded signal supplied out over the DATA OUT line from memory chip 52 is supplied to one input of the comparator circuit in the form of EXCLUSIVE OR gate 81 shown in FIG. 5. The first coded signal is supplied at the same rate as the RECEIVED SIGNAL and as long as the first coded signal matches the RECEIVED SIGNAL bit for bit, the output level from EXCLUSIVE OR gate 81 will not change. At the end of the receive sequence, address line A4 to memory chip 52 goes high which causes the output from NOR gate 55 to go low and results in a high output from inverter 56. This high output indicates the transmit mode for battery access control card 10 and enables NAND gate 57 to begin passing the second coded signal supplied by memory chip 52. Since a third input to NAND gate 57 is connected to the read/write input $R/\overline{W}$, NAND gate 57 will only pass the second code out during the read operation. NOR gate 55 decodes the A4 and A5 address lines which, as shown in FIG. 6B insures that the transmit mode signal will remain high during the entire transmit mode.

The second coded signal is supplied over the transmit enable line to a corresponding input to flip-flop 82 shown in FIG. 5. Flip-flop 82 is configured along with flip-flop 83 to supply the second coded signal through transistor 84 as the TRANSMIT SIGNAL which is connected back through FIG. 3A to antenna 11. At the end of the transmission cycle, AND gate 61 decodes address lines A2 and A6 for providing the END OF CYCLE signal which is connected back to OR gate 45 for providing the CLOCK RESET signal to flip-flop 27 which resets flip-flop 27 and thereby disables the clock shown in FIG. 3B and the operation is terminated. Also, when the $\overline{\text{CLOCK ENABLE}}$ signal goes high, flip-flop 32 of FIG. 3B is reset for providing the COUNTER RESET signal to reset counter 33, flip-flop 34, counter 53, and flip-flop 51 for disabling memory chip 52. Thus, the circuit is now in a condition for receiving a new transmission from the card reader.

If during the receive mode there had not been a match between corresponding bits of the RECEIVED SIGNAL and the first coded signal as compared by EXCLUSIVE OR gate 81, the output of EXCLUSIVE OR gate 81 will go high for switching flip-flop 86 upon the next 2500 Hz clock pulse. When flip-flop 86 switches, flip-flop 87 will switch upon receiving the next $\overline{\text{STROBE}}$ pulse. Flip-flops 86 and 87 are designed to delay the MISMATCH signal until the STROBE output goes low. The DELAYED MISMATCH signal is then supplied to OR gate 45 of FIG. 3A for resetting flip-flop 27 and thereby resetting all of the other counters and flip-flops of the circuit through flip-flop 32 and its output COUNTERS RESET. As will be understood, the DELAYED MISMATCH signal can be provided at any time beginning with the first bit of the RECEIVED SIGNAL and including the last bit of the RECEIVED SIGNAL. If a DELAYED MISMATCH signal is received, the operation of the clock shown in FIG. 3B will be terminated before the clock begins the addressing sequence of memory chip 52 for supplying the second coded signal to the transmit circuit shown in FIG. 5.

In FIG. 4, a PROGRAM input is used for storing new codes in memory chip 52. When the PROGRAM input goes low, memory chip 52 is enabled for a write operation and will write into memory a RECEIVED SIGNAL received at its $D_{in}$ input.

The embodiments of the invention in which an exclusive property or right is claimed are defined as follows:

1. An access control card used in access control systems comprising:

a battery;

wireless signal receiving means for receiving a coded wireless signal generated by a card reader;

clock means connected to the battery and including a receiver connected to the antenna for supplying a received signal based upon said coded wireless signal;

memory means for storing first and second stored codes; and, transmit means connected to said wireless signal receiving means, to said clock means and to said memory means for comparing said first stored code and said received signal and for transmitting said second stored code when there is a match between said received signal and said first stored code.

2. The card of claim 1 wherein said transmit means comprises comparator means for providing a mismatch signal when said received signal and said first stored code do not match, and said clock means comprises a clock and clock enable means responsive to said mismatch signal for terminating operation of said clock.

3. The card of claim 2 wherein said memory means comprises a counter responsive to said clock for providing addresses and a memory circuit responsive to said addresses for supplying said first stored code to said comparator means, said clock continuing to drive said address counter if said received signal has been successfully compared to said first stored code and for interrupting said counter if said first stored code is not successfully compared to said received signal.

4. The card of claim 3 wherein said counter has a plurality of outputs and said memory means further comprises a decoder circuit for decoding selected outputs of said counter for enabling said transmit means to transmit said second stored code only during a transmit mode, said transmit mode only occurring after the first stored code has been compared to the received signal.

5. The card of claim 4 wherein said memory means comprises an end of cycle decoder connected to selected outputs of said counter for providing an end of cycle signal after said second stored code has been supplied by said memory means to said transmit means, said end of cycle signal resetting said clock enable means to interrupt said clock.

6. The card of claim 5 wherein said clock comprises an oscillator responsive to said clock enable means for providing an output and a counter-decoder circuit responsive to said output from said oscillator to drive said counter of said address means.

7. The card of claim 6 wherein said clock enable means comprises flip-flop means responsive to the beginning of said received signal for energizing said clock and responsive to said end of cycle signal and said mismatch signal for terminating operation of said clock.

8. The card of claim 1 wherein said memory means comprises a counter responsive to said clock means for providing addresses and a memory circuit responsive to said addresses for supplying said first stored code to said transmit means, said clock means continuing to drive said address counter if said received signal and said first stored code have been successfully compared by said transmit means and for interrupting said address counter if said first stored code is not successfully compared to said received signal.

9. The card of claim 8 wherein said counter has a plurality of outputs and said memory means further comprises a decoder circuit for decoding selective outputs of said address counter for enabling said transmit means to transmit said second stored code only during a transmit mode, said transmit mode only occurring after the first stored code has been compared to the received signal.

10. The card of claim 9 wherein said memory means comprises an end of cycle decoder connected to selected outputs for said counter for providing an end of cycle signal after said second stored code has been supplied by said memory means to said transmit means, said end of cycle signal resetting said clock means to interrupt said clock means.

11. The card of claim 10 wherein said clock means comprises an oscillator for providing an output and a counter-decoder circuit responsive to said output from said oscillator to drive said counter of said address means.

12. The card of claim 1 wherein said memory means comprises a counter driven by said clock means and having a plurality of outputs, and a decoder circuit for decoding selected outputs of said counter for enabling said transmit means to transmit said second stored code only during a transmit mode, said transmit mode only occurring after the first stored code and said received signal have been compared by said transmit means.

13. The card of claim 12 wherein said memory means comprises an end of cycle decoder connected to selected outputs from said counter for providing an end of cycle signal after said second stored code has been supplied by said memory means to said transmit means, said end of cycle signal resetting said clock means to interrupt said clock means.

14. The card of claim 13 wherein said clock means comprises an oscillator for providing an output and a counter-decoder circuit responsive to said output from said oscillator to drive said counter of said address means.

15. The card of claim 1 wherein said wireless signal receiving means comprises an antenna and said coded wireless signal comprises a coded radio frequency signal.

16. The card of claim 15 wherein said transmit means comprises comparator means for providing a mismatch signal when said received signal and said first stored code do not match, and said clock means comprises a clock and clock enable means responsive to said mismatch signal for terminating operation of said clock.

17. The card of claim 16 wherein said memory means comprises a counter responsive to said clock for providing addresses and a memory circuit responsive to said addresses for supplying said first stored code to said comparator means, said clock continuing to drive said address counter if said received signal has been successfully compared to said first stored code and for interrupting said counter if said first stored code is not successfully compared to said received signal.

18. The card of claim 17 wherein said counter has a plurality of outputs and said memory means further comprises a decoder circuit for decoding selected outputs of said counter for enabling said transmit means to transmit said second stored code only during a transmit mode, said transmit mode only occurring after the first stored code has been compared to the received signal.

19. The card of claim 18 wherein said memory means comprises an end of cycle decoder connected to selected outputs of said counter for providing an end of cycle signal after said second stored code has been supplied by said memory means to said transmit means, said end of cycle signal resetting said clock enable means to interrupt said clock.

20. The card of claim 19 wherein said clock comprises an oscillator responsive to said clock enable means for providing an output and a counter-decoder circuit responsive to said output from said oscillator to drive said counter of said address means.

21. The card of claim 20 wherein said clock enable means comprises flip-flop means responsive to the beginning of said received signal for energizing said clock and responsive to said end of cycle signal and said mismatch signal for terminating operation of said clock.

22. The card of claim 15 wherein said memory means comprises a counter responsive to said clock means for providing addresses and a memory circuit responsive to said addresses for supplying said first stored code to said transmit means, said clock means continuing to drive said address counter if said received signal and said first stored code have been successfully compared by said transmit means and for interrupting said address counter if said first stored code is not successfully compared to said received signal.

23. The card of claim 22 wherein said counter has a plurality of outputs and said memory means further comprises a decoder circuit for decoding selective outputs of said address counter for enabling said transmit means to transmit said second stored code only during a transmit mode, said transmit mode only occurring after the first stored code has been compared to the received signal.

24. The card of claim 23 wherein said memory means comprises an end of cycle decoder connected to selected outputs for said counter for providing an end of cycle signal after said second stored code has been supplied by said memory means to said transmit means, said end of cycle signal resetting said clock means to interrupt said clock means.

25. The card of claim 24 wherein said clock means comprises an oscillator for providing an output and a counter-decoder circuit responsive to said output from said oscillator to drive said counter of said address means.

26. The card of claim 15 wherein said memory means comprises a counter driven by said clock means and having a plurality of outputs, and a decoder circuit for decoding selected outputs of said counter for enabling said transmit means to transmit said second stored code only during a transmit mode, said transmit mode only occurring after the first stored code and said received signal have been compared by said transmit means.

27. The card of claim 26 wherein said memory means comprises an end of cycle decoder connected to selected outputs from said counter for providing an end of cycle signal after said second stored code has been supplied by said memory means to said transmit means, said end of cycle signal resetting said clock means to interrupt said clock means.

28. The card of claim 27 wherein said clock means comprises an oscillator for providing an output and a counter-decoder circuit responsive to said output from said oscillator to drive said counter of said address means.

29. An access control card used in access control systems comprising:

a battery;

an antenna for receiving a coded radio frequency signal generated by a card reader;

a receiver connected to said antenna and to said battery for supplying a received signal based upon said coded radio frequency signal;

a clock connected to said receiver and to said battery for supplying a clock signal upon receipt by the receiver of said coded radio frequency signal;

memory means connected to said clock for storing first and second stored codes and for supplying said first and second stored codes to an output of said memory means in response to said clock signal;

comparator means connected to said output of said memory means and connected to said receiver for comparing said first stored code to said received signal and connected to said clock means for terminating said clock signal when there is a mismatch between said first stored code and said received signal; and, transmit means connected to said antenna, to said clock means and to said memory means for transmitting said second stored code after said first stored code has been successfully compared to said received signal.

30. The card of claim 29 wherein said clock means comprises a clock and clock enable means responsive to said comparator means for terminating operation of said clock when there is a mismatch between said first stored code and said received signal.

31. The card of claim 30 wherein said memory means comprises a counter responsive to said clock for providing addresses and a memory circuit responsive to said addresses for supplying said first stored code to said comparator means, said clock continuing to drive said counter if said received signal has been successfully compared to said first stored code and for interrupting said counter if said first stored code is not successfully compared to said received signal.

32. The card of claim 31 wherein said counter has a plurality of outputs and said memory means further comprises a decoder circuit for decoding selected outputs of said counter for enabling said transmit means to transmit said second stored code only during a transmit mode, said transmit mode only occurring after the first stored code has been compared to the received signal.

33. The card of claim 32 wherein said memory means comprises an end of cycle decoder connected to selected outputs of said counter for providing an end of cycle signal after said second stored code has been supplied by said memory means to said transmit means, said end of cycle signal resetting said clock enable means to interrupt said clock.

34. The card of claim 29 wherein said memory means comprises a counter responsive to said clock means for providing addresses and a memory circuit responsive to said addresses for supplying said first stored code to said comparator means, said clock means continuing to drive said counter if said received signal has been successfully compared to said first stored code and for interrupting said counter if said first stored code signal is not successfully compared to said received signal.

35. The card of claim 34 wherein said counter has a plurality of outputs and said memory means further comprises a decoder circuit for decoding selected outputs of said counter for enabling said transmit means to transmit said second stored code only during a transmit mode, said transmit mode only occurring after the first stored code has been compared to the received signal.

36. The card of claim 35 wherein said memory means comprises an end of cycle decoder connected to selected outputs from said counter for providing an end of cycle signal after said second stored code has been supplied by said memory means to said transmit means, said end of cycle signal resetting said clock means to interrupt said clock means.

37. The card of claim 29 wherein said memory means comprises a counter-driven by said clock means and having a plurality of outputs, and a decoder circuit for decoding selected outputs of said counter for enabling said transmit means to transmit said second stored code only during a transmit mode, said transmit mode only occurring after the first stored code has been compared to the received signal.

38. The card of claim 37 wherein said memory means comprises an end of cycle decoder connected to selected outputs from said counter for providing an end of cycle signal after said second stored code has been supplied by said memory means to said transmit means, said end of cycle signal resetting said clock means to interrupt said clock means.

* * * * *